June 7, 1960
L. L. CHARLSON
2,939,429
ROTARY VALVE FOR POWER STEERING MECHANISM
Filed Oct. 21, 1957
3 Sheets-Sheet 1
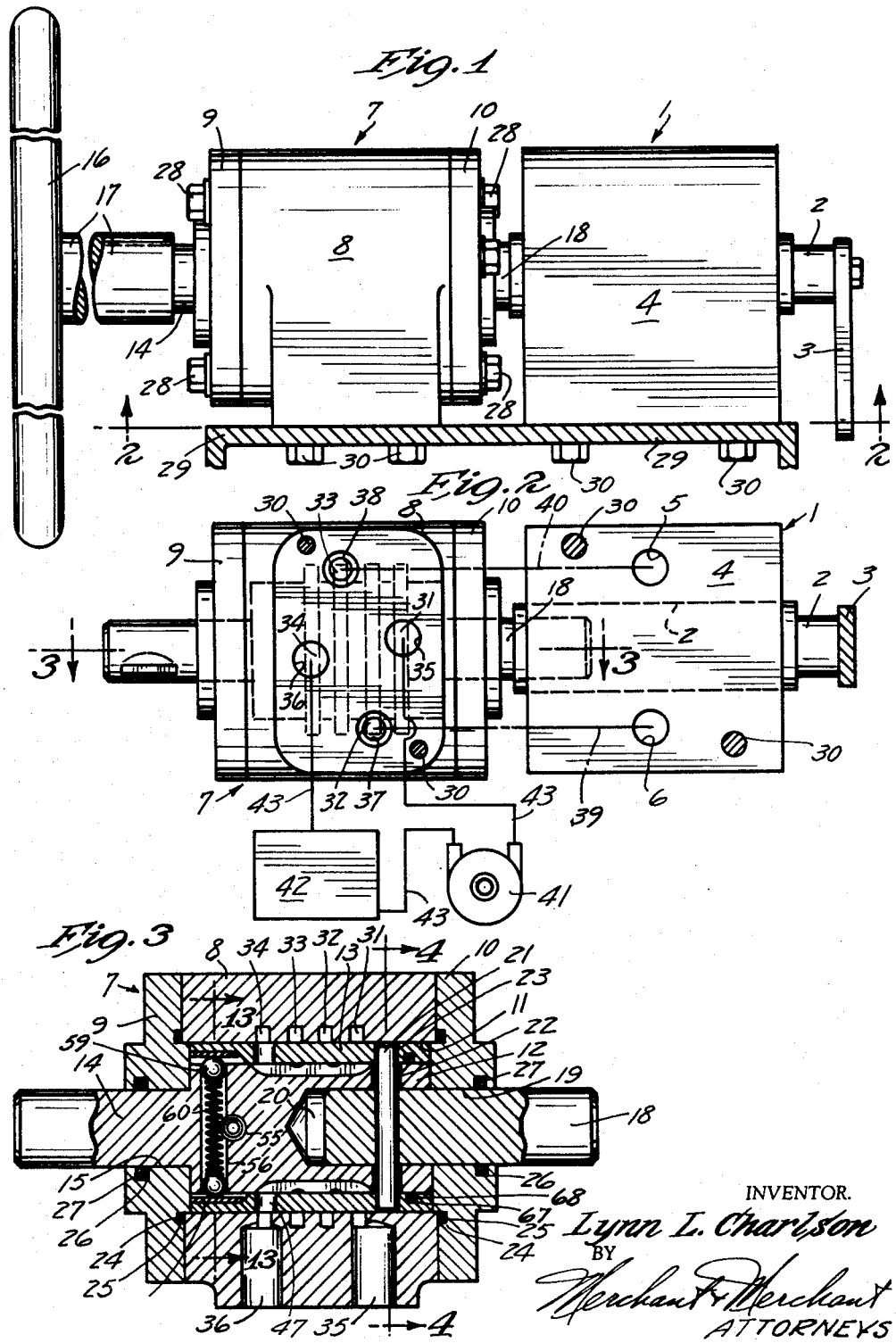
INVENTOR.
Lynn L. Charlson
BY
Merchant & Merchant
ATTORNEYS

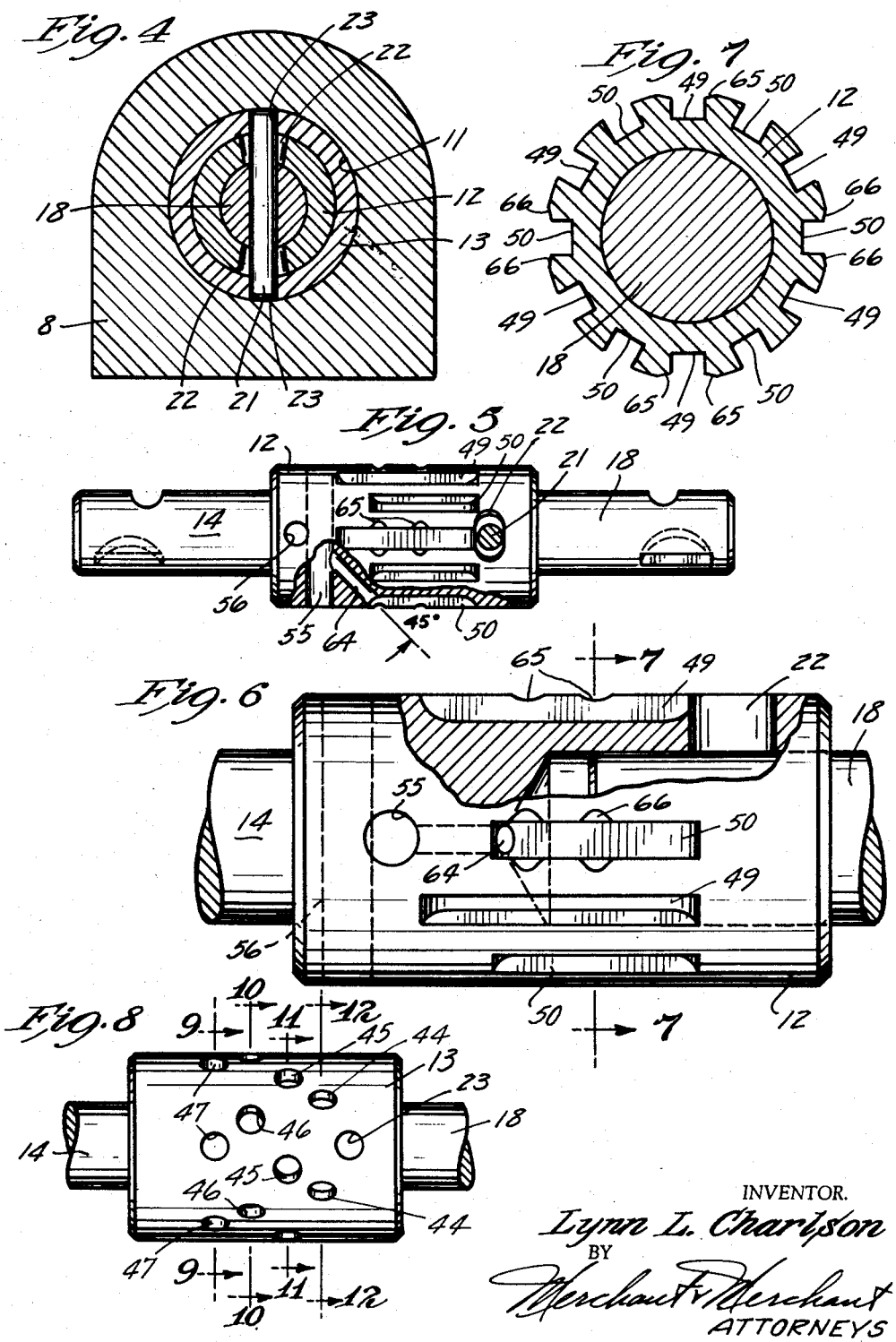

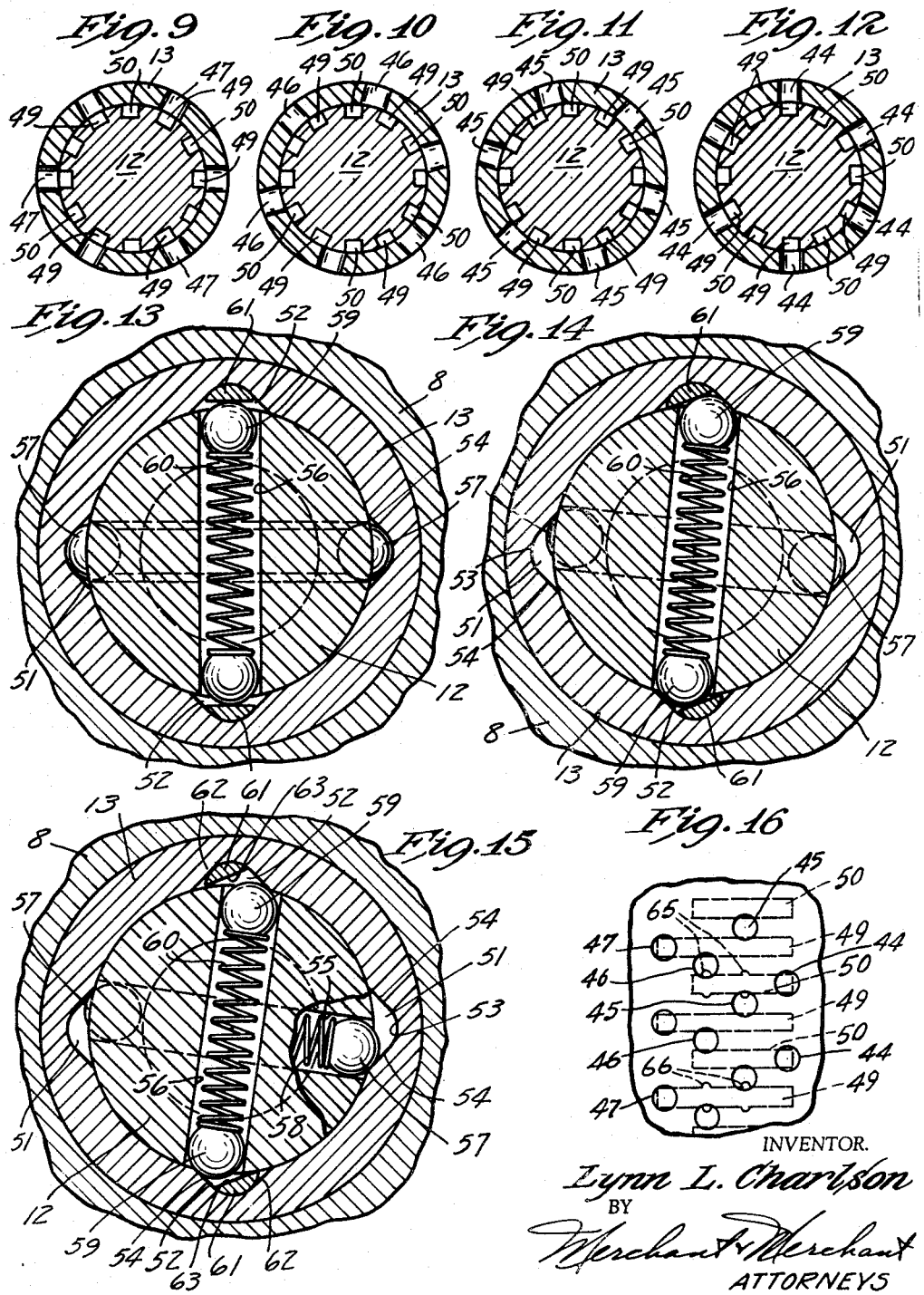

United States Patent Office 2,939,429
Patented June 7, 1960

2,939,429

ROTARY VALVE FOR POWER STEERING MECHANISM

Lynn L. Charlson, Minneapolis, Minn., assignor to Germane Corporation, Minneapolis, Minn., a corporation of Minnesota Filed Oct. 21, 1957, Ser. No. 691,458

2 Claims. (Cl. 121—41)

My invention relates generally to valves used in fluid pressure systems and more particularly to valves of the reversing type utilized to govern the extent of movement in opposite directions of a fluid pressure operated device.

More specifically, my invention relates to a control valve having a manually operated control member, the extent of movement of which, in a given direction, determines the extent of movement of the fluid pressure operated device in a corresponding direction, the present valve being particularly adapted for use in fluid pressure operated power steering mechanisms for automotive vehicles such as automobiles, trucks, tractors and the like.

Heretofore, in power steering mechanisms of the type utilizing fluid pressure operated devices, difficulty has been experienced in overcoming oscillation or vibration in the fluid pressure system due to backlash in mechanical linkage of the mechanism, road shocks and the like, this oscillation or vibration being usually set up to an objectionable degree in the control valve. This is particularly true in heavy vehicles such as large trucks, tractors and the like, wherein the steering load is very heavy and high friction is present in the steering mechanism.

The primary object of my invention is the provision of a control valve for mechanisms of the above type, having novel means for substantially eliminating oscillation or vibration therein due to backlash and frictional loads, as set forth. To this end I provide a control valve including a pair of relatively movable valve elements, one being adapted to be connected to the driven portion of a fluid pressure operated device, and the other being connected to a control element movable by the operator of the vehicle, and passage means defined by said valve elements having metering portions which materially contribute to the sensitivity and smoothness of operation of the control valve.

For further reducing said vibration I provide mechanical means which urge the valve elements toward a neutral relationship, and passage means for admission of fluid under pressure to said mechanical means to aid the same in maintaining the valve elements in their neutral relationship. In connection with said mechanical means, I provide braking elements which prevent over-travel of the valve elements toward their neutral relationship, and consequent vibration between said elements.

Another object of my invention is the provision of a valve having a pair of cooperating relatively movable valve elements as set forth, and of an independent viscous dampening or friction device engaging said valve elements to retard relative movement therebetween in either direction without preventing said relative movement of the valve elements toward their neutral relationship.

Another object of my invention is the provision of a control valve as set forth, which is readily adapted for use with various fluid pressure operated mechanisms, either of the reciprocatory or of the rotary type.

Another object of my invention is the provision of a valve for a fluid pressure operated power steering device which, when the source of fluid under pressure is cut off, will not hamper the manual steering effort of the vehicle operator.

Still another object of my invention is the provision of a valve of the above type which is relatively simple and inexpensive to produce, which is highly efficient in operation and which is compact and rugged in construction and durable in use.

The above, and still further highly important objects and advantages of my invention, will become apparent from the following detailed specification, appended claims and attached drawings.

Referring to the drawings, which illustrate the invention, and in which like reference characters indicate like parts throughout the several views.

Fig. 1 is a view in side elevation of a conventional fluid pressure motor showing the valve of my present invention coupled thereto;

Fig. 2 is a view partly in bottom plan, partly in section, and partially diagrammatic, as seen substantially from the line 2—2 of Fig. 1;

Fig. 3 is an enlarged axial section taken substantially on the line 3—3 of Fig. 2;

Fig. 4 is a transverse section taken on the line 4—4 of Fig. 3;

Fig. 5 is a view in plan of the primary valve element and primary and secondary control shafts of my invention, some parts being broken away and some parts being shown in section;

Fig. 6 is an enlarged fragmentary view in front elevation of the structure shown in Fig. 5, some parts being broken away and some parts being shown in section;

Fig. 7 is a transverse section taken on the line 7—7 of Fig. 6;

Fig. 8 is a fragmentary view in plan of the secondary valve element of my invention and the primary and secondary control shafts thereof;

Figs. 9, 10, 11 and 12 are views in transverse section, taken on the lines 9—9, 10—10, 11—11 and 12—12 respectively of Fig. 8;

Fig. 13 is an enlarged fragmentary view in transverse section taken on the line 13—13 of Fig. 3;

Fig. 14 is a view corresponding to Fig. 13 but showing a different position of some of the parts;

Fig. 15 is a view corresponding to Figs. 13 and 14 but showing a still different position of some of the parts; and Fig. 16 is a diagram showing the relative position of the ports and the passages in the primary and secondary valve elements of my invention.

Referring with greater detail to the drawings, the numeral 1 indicates, in its entirety, a conventional rotary fluid pressure operated motor including a drive shaft 2 to one end of which is rigidly secured a crank 3 which, for the purpose of the present example, is adapted to be operatively coupled to the steering linkage of an automotive vehicle, such as a tractor, not shown. The housing 4 of the fluid motor 1 is shown in Fig. 2 as being provided with ports 5 and 6 whereby fluid under pressure is delivered to the motor 1 and discharged therefrom. Although the fluid pressure motor 1 has been described as a rotary motor, it should be borne in mind that the same may be in the nature of a conventional fluid pressure cylinder and reciprocatory piston type, in which event the ports 5 and 6 will be disposed at opposite ends of the cylinder.

The control valve of my invention includes a housing 7 comprising a main body 8 and a pair of end cap members 9 and 10, said main body and end cap members cooperating to define a cylindrical chamber 11. The control valve 7 further includes a cylindrical primary valve element 12 extending axially of the chamber 11, and a tubular secondary valve element 13 closely encompassing the primary valve element 12 and having its outer cylindrical surface closely slidably engaging the cylindrical surface of the chamber 11, whereby the secondary valve element 13 may be rotated in the chamber 11 and the primary valve element 12 may be rotated with respect to the secondary valve element 13, both on the axis of the cylindrical chamber 11. A primary control shaft 14 is integrally formed with the primary valve element 12 and extends axially outwardly therefrom through an axial bore 15 in the end cap member 9. The primary control shaft 14 is adapted to be connected to the steering wheel 16 of the vehicle not shown, by means of an elongated shank 17 shown fragmentarily in Fig. 1, for common rotary movement therewith. A secondary control shaft 18 extends axially through an axial bore 19 in the end cap member 10 coaxial with the chamber 11, primary and secondary valve elements 12 and 13 respectively and the primary control shaft 14. The inner end of the secondary control shaft 18 is contained within an axial recess 20 in the primary valve element 12, and is rigidly connected to the secondary valve element 13 by means of a pin or the like 21 that extends diametrically through the inner end portion of the secondary control shaft 18 and radially outwardly through diametrically opposed circumferentially elongated radial slots 22 in the adjacent end portion of the primary control element 12, the outer ends of the pin 21 being snugly received in aligned radial openings 23 in the adjacent end portion of the secondary tubular valve element 13, see Figs. 3 and 4. As shown in Figs. 1 and 2, the outer end portion of the secondary control shaft 18 is adapted to be rigidly secured to the drive shaft 2 of the fluid pressure motor 1 for common rotation therewith. In the event that the control valve 7 is used to control relative movement between a piston and its cooperating cylinder, as above indicated, such control may be had by rigidly connecting the inner end of the crank 3 to the secondary control shaft 18 and operatively coupling the outer end of the crank 3 to the reciprocatory element of the piston cylinder motor, so that such reciprocatory movement in either direction will cause rotary movement to be imparted to the secondary control shaft 18 in a corresponding direction. As shown in Fig. 3, the end cap members 9 and 10 are formed to provide annular grooves 24 for the reception of O-rings to seal the joints or connections between the end cap members 9 and 10 and the main body 8 against leakage of fluid from the chamber 11. Said end cap members 9 and 10 are further provided with circumferential channels 26 in the bores 15 and 19 respectively, said channels 26 having mounted therein O-rings 27 which are utilized to prevent leakage of fluid from the chamber 11 through the bores 15 and 19 in which the control shafts 14 and 18 are respectively journalled. As shown in Fig. 1, the end caps 9 and 10 are secured to the main body 7 by circumferentially spaced mounting screws or the like 28, the showing of these screws being omitted in Figs. 2 and 3. The motor 1 and valve 7 are adapted to be mounted in a convenient position on the vehicle, not shown, by suitable means, such as a bracket 29 and screws 30.

The main body 8 of the control valve 7 is formed to provide a plurality, as shown four, of axially spaced circumferential channels 31, 32, 33 and 34, which open radially into the chamber 11, see Fig. 3. The valve body 7 further defines an inlet passage 35 which communicates with the chamber 11 through the circumferential channel 31, and a return passage 36 which communicates with the chamber 11 by means of the circumferential channel 34. With reference to Fig. 2, it will be seen that the valve body 7 further defines ports 37 and 38 which communicate with the chamber 11 through respective channels 32 and 33. As shown diagrammatically in Fig. 2, the ports 37 and 38 are adapted to be connected to the ports 5 and 6 respectively of the motor 4 by means of conduit connections indicated at 39 and 40 respectively. The inlet passage 35 is adapted to be connected to a source of fluid under pressure, such as a motor driven pump 41 which receives fluid from a reservoir indicated at 42, the pump 41 and the reservoir 42 being interposed in a conduit 43 connected at one end to the inlet passage 35 and at its other end to the return passage 36.

The tubular secondary valve element 13 is provided with a plurality of axially spaced circumferential rows of radial ports 44, 45, 46 and 47 each in register with a respective one of the channels 31, 32, 33 and 34 in the valve body 8. As shown in Fig. 8 and in the diagram of Fig. 16, the ports of each row thereof are circumferentially offset or staggered with respect to the ports of the others of said rows for a purpose which will hereinafter become apparent. Although I have shown six ports in each of the axially spaced rows thereof, this number may be varied according to the capacity requirements of different installations. The cylindrical primary valve element 12 is formed to provide a plurality of circumferentially spaced fluid passages in the nature of alternately relatively long and relatively short axially extending channels 49 and 50 respectively, there being twice as many such channels as there are ports in any given circumferential row thereof in the secondary valve element 13. In other words, in the valve illustrated, the primary valve element 12 will be provided with six relatively long channels 49 and six relatively short channels 50, inasmuch as there are six ports in any given circumferential row thereof in the secondary valve element 13. The width and spacing of the channels 49 and 50 is such, relative to the diameter and spacing of the secondary valve element ports 44, 45, 46 and 47 in the several rows thereof that, when the valve elements 12 and 13 are in neutral relationship, each of the channels 49 is in full register with a different port 47 and in partial register with a port 45 and a port 46, and each channel 50 is in full register with a different port 44 and in full register with a port 45 and a port 46. Figs. 4, 9–12 and 16 show the primary and secondary valve elements 12 and 13 respectively in the above mentioned neutral relationship. When the primary and secondary valve elements are thus positioned relative to each other, the portions of the pin 21 contained in the slots 22 are positioned centrally between the opposite circumferentially spaced ends of their respective slots 22. When fluid under pressure is introduced from the pump 41 to the inlet passage 35, the primary and secondary valve elements being disposed in their relative neutral positions, said fluid flows into the annular channel 31, radially inwardly through the ports 44 to the channels 50, from thence through the ports 45 and 46 to the channels 49 and from thence radially outwardly through the ports 47, and through the channel 34 and return passage 36 to the reservoir 42. In view of the fact that the secondary valve element ports 45 and 46 are in partial register with common channels 49 or 50, fluid pressure in the conduit elements 39 and 40 is substantially equal and no movement of the fluid motor drive shaft 2 occurs.

Rotation of the steering wheel 16 and the primary control shaft 14 and primary control element 12 in a clockwise direction with respect to Figs. 9–12, to the extent that opposite ends of the circumferentially extended slots 22 move into engagement with adjacent portions of the pin 21, causes each of the channels 50 of the primary valve element to move completely out of registration with an adjacent one of the ports 46 and toward fuller registration with the adjacent one of the ports 45, while remaining in at least partial registration with a cooperating one of the ports 44. Simultaneously, the relatively long channels 49 move out of registration with their respective ports 45 and toward full registration with their cooperating ports 46 while remaining in at least partial registration with their cooperating ports 47. Assuming that the pump 41 is in operation, fluid under pressure will then move radially inwardly through the ports 44, through the channels 50, and outwardly through the ports 45, through the channels 32, outwardly through the port 37 in the valve body 8 and to the port 6 in the motor 1 through the conduit connection 39. Entry of fluid under pressure to the motor 1 through the port 6 causes the drive shaft 2 to be rotated in the same direction as that manually imparted to the steering wheel 16. Return fluid from the motor 1 enters the port 38 in the valve body 8 and from thence through the channel 33, inwardly through the ports 46, longitudinally of the channels or passages 49, and outwardly through the ports 47 to the channel 34 and outwardly of the return passage 36 to the reservoir 42. Inasmuch as the secondary control shaft 18 is operatively coupled to the drive shaft 2 for common rotation therewith, rotation of the shaft 2 in the same direction as that manually imparted to the primary control shaft 14 will move the secondary valve element 13 toward a neutral relationship with the primary valve element 12 wherein the pin 21 is centered with respect to the circumferential dimensions of the slots 22, and wherein the channels 49 and 50 of the primary valve element 12 are positioned relative to the ports 44—47 as indicated in Figs. 9–12 and 16. Rotation manually imparted to the primary valve element 12 in a counterclockwise direction with respect to Figs. 4 and 9–12 causes the channels or passages 50 to move out of registration with their respective ports 45 and toward full registration with the ports 46 while remaining in registration with the ports 44, and the relatively long passages 49 to move out of registration with their respective ports 46 and toward full registration with their respective ports 45 while remaining in registration with their respective ports 47. Fluid under pressure is then supplied to the fluid pressure motor 1 to cause rotation of the drive shaft 2 in the opposite direction to that above described until the valve elements 12 and 13 again reach a neutral relationship. It will be noted that fluid under pressure will be supplied to the motor 1 continuously for as long as the operator rotates the steering wheel in either direction, and that the supply of fluid under pressure to the motor 1 will be shut off only when the valve elements 12 and 13 arrive at a neutral relationship.

In order that the operator of a vehicle through the steering apparatus of which the instant device may be applied, retains some of the "road feel" generally caused by minor road shocks to the steering apparatus, and for the purpose of preventing over-travel and consequent oscillation or vibration of the valve elements toward opposite sides of said neutral relationship, I provide novel structure now to be described. With reference to Figs. 3 and 13–15, it will be seen that the secondary valve element 13 is provided at its end portion adjacent the primary control shaft 14 with a plurality of circumferentially spaced axially extended recesses 51 and 52 which open radially inwardly toward the adjacent end portion of the primary valve element 12. Each of the recesses 51 and 52 define arcuate or concave bottom surface portions 53 and flat sides 54 which converge toward the bottoms of their respective recesses 51 and 52 and which are tangent to their respective bottom portions 53. As shown in Figs. 13–15, the recesses 51 and 52 are arranged in diametrically opposed pairs, the recesses 52 being circumferentially spaced from the recesses 51 substantially 90° of circular arc. A pair of cylindrical passages or cavities 55 and 56 extend through the primary valve element 12 at its end portion adjacent the primary control shaft 14, and at right angles to each other, the opposite ends of the cavity 55 being in register with the recesses 51, and the opposite ends of the cavity 56 being in register with the recesses 52 when the primary and secondary valve elements 12 and 13 are in their neutral relationship. With reference to Fig. 3 it will be noted that the cavities 55 and 56 are in such relationship axially of the primary valve element 12 so that one thereof partially intersects the other thereof. Mounted for radial movements in opposite ends of the cavity 55 are ball detent elements 57 that are yieldingly urged in a radially outward direction by a coil compression spring 58 in the cavity 55, toward seating engagement with the concave bottoms of the recesses 51. Likewise mounted for radial movement in the opposite ends of the cavity 56 are similar ball detent elements 59 that are yieldingly urged toward the bottoms of the recesses 52 by a coil compression spring 60 in the cavity 56. When the detent elements 57 are seated in the concave bottoms 53 of their respective recesses 51 as shown in Fig. 13, the valve elements 12 and 13 then being in their neutral relationship, a predetermined load or steering effort must be applied by the operator to the steering wheel 16 to cause the detent elements 57 to be cammed radially inwardly by their respective recess walls 54 against yielding bias of the spring 58 to render the fluid pressure motor 1 operative. The resistance to turning effort, set up by the spring loaded ball detent elements 57 permits the motor road shocks to be transferred from the vehicle wheels to the steering wheel, so that the operator of the vehicle experiences substantially the same feel of the road as is present with most conventionally manually operated steering apparatus. The spring pressed ball detent elements 59 operate in the same manner as the detent elements 57, and have camming action with the sloping walls 54 of their respective recesses 52 to aid in imparting the above mentioned road sense or feel to the operator. After the steering wheel 15 has been turned to the desired extent, and during the time that the drive shaft 2 of the motor 1 is imparting rotation to the secondary control shaft 18 and secondary valve element 13 to bring the valve elements 12 and 13 to their neutral relationship, the springs 58 and 60 exert yielding bias against their respective detent elements 57 and 59 to urge the valve elements toward their neutral relationship. Due to this urging effort, and also due to the fact that some coasting may occur in the motor 1, there is a tendency for the valve elements to move slightly beyond their neutral relationship to cause the motor to operate in the opposite direction, and oscillation or vibration in the valve elements results. For the purpose of retarding the final movement of the valve elements 12 and 13 toward their neutral relationship whereby to reduce the above mentioned oscillation or vibration to a minimum, I provide a pair of cross sectionally segmental shoes 61, each contained in a different one of the recesses 52, and each having an arcuate surface 62 of substantially the same radius of that of the arcuate or concave bottom portion 53 of the recesses 52. The shoes 61 are further provided with flat surfaces 63 that are engaged by the ball detent elements 59 during relative movement between the valve elements 12 and 13. As shown in Figs. 13–15, engagement of the shoes 61 by their respective detent elements 59 causes the shoes 61 to be laterally displaced during relative movement between the valve elements 12 and 13. When the steering wheel 16 is turned by the operator to the point where one of the ends of slots 22 engage the pin 21, the recesses 51 and 52 and their respective detent elements 57 and 59 assume the relative positions shown in Fig. 15. Thereafter upon stopping of rotation of the steering wheel 16 and during the time in which the motor shaft 2 is rotating the tubular valve element 13 toward neutral relationship with the primary valve element 12, the detent elements 57 and 59 approach the bottoms of their respective recesses 51 and 52, as indicated in Fig. 14. Here it will be noted that the detent elements 59 engage the flat surface portions 63 of the shoes 61 which set up a resistance to movement of the valve elements toward their neutral relationship, and effectively retard such movements. Then, during final movement of the valve elements to their neutral position or relationship, as shown in Fig. 13, pressure of the spring 58 against the ball detent elements 59 causes the shoes 61 to frictionally move to their relative positions of Fig. 13, the detent elements 57 being seated in the bottoms of their respective recesses 51. Obviously, a substantial amount of effort is necessary for the detent elements 59 to move the shoes 61 from their position of Fig. 14 to their positions of Fig. 13 against the frictional load between the arcuate surfaces of the shoes 61 and the concave bottom portions of their respective recesses 52. To further aid the springs 58 and 60 in urging their respective detent elements 57 and 59 toward the bottoms of their respective recesses, I provide conduit means in the nature of a fluid passage 64 extending from the bottom of one of the channels 50 in the primary valve element 12 to the central portion of the cavity 55, whereby fluid under pressure is admitted to both cavities 55 and 56 radially inwardly of the detent elements 57 and 59 to further urge said detent elements radially outwardly toward the bottoms of their respective recesses.

With reference particularly to Figs. 5, 6, and 7, it will be seen that a pair of diametrically opposed relatively long channels 49 are provided at their sides with relatively small, shallow metering notches 65 which add to the effective width of said channels 49 at points longitudinally thereof movable into and out of register with the ports 45 and 46 in the secondary valve element 13. Likewise, a diametrically opposed pair of the relatively short channels 50 are provided with similar metering notches 66 also registrable with given ones of the ports 45 and 46. These notches 65 and 66 are relatively small and shallow, and are highly effective in adding to the smoothness of operation of the valve and to the sensitivity of control by decreasing the abruptness with which fluid is cut off from some of the ports in the secondary valve element 13 and introduced to other ports thereof. By thus making more gradual the introduction of fluid to these ports and shutting off of fluid therefrom, the metering notches 65 and 66 contribute to a substantial degree in reducing oscillation or vibration in the valve.

At the end portion opposite the recesses 51 and 52, the secondary valve element 13 is formed to provide a radially inwardly opening circumferential channel 67 in which is seated an annular friction device in the nature of a rubber-like ring 68. The ring 68 is of a size to snugly engage the adjacent outer cylindrical surface of the primary valve element 12 to exert a frictional resistance against relative movement between the primary valve element 12 and the secondary valve element 13. The elasticity of the ring 68 permits a minute degree of relative movement between the valve elements 12 and 13 before slippage occurs between the ring 68 and the valve element 12, whereby to provide a form of viscous dampening between the valve elements 12 and 13. The frictional drag between the ring 68 and the adjacent surface of the primary valve element 12 tends to retard relative rotation between the valve elements 12 and 13 in either direction and is very effective in eliminating relative oscillation between the valve elements. In some instances it has been found that the frictional drag of the ring 68 on the primary valve element 12 has been so effective in eliminating oscillation or vibration in the valve even when the segmental shoes 61 have been removed from their respective recesses 52.

If, for any reason, the supply of fluid under pressure to the valve 7 should be cut off, the steering apparatus is operated manually and in the convenitonal manner, there being lost motion between the steering wheel 16 and the drive shaft 2 only to the extent that the opposite ends of the radial slots 22 are spaced from adjacent portions of the pin 21 connecting the valve elements to the secondary control shaft 18.

From the above it will be seen that I have provided a control valve capable of efficiently accomplishing the objectives set forth; and while I have shown a commercial embodiment of my novel valve, it will be understood that the same is capable of modification without departure from the spirit and scope of the invention as defined in the claims.

What I claim is:

1. In a reversing valve, a housing defining a cylindrical chamber, a cylindrical primary valve element extending axially of said chamber, a tubular secondary valve element closely encompassing said primary valve element and having its outer cylindrical surface closely slidably engaging the cylindrical surface of said chamber, axially aligned primary and secondary control shafts extending axially of said chamber and journalled in opposite ends of said housing, said primary control shaft being connected to said primary valve element for common rotation therewith, means rigidly connecting said secondary valve element to said secondary control shaft for common rotation therewith and coupling said valve elements together for independent rotation in opposite directions relative to each other between an intermediate neutral relationship and predetermined limits of said independent rotation and for common unlimited rotation in opposite directions, said means comprising a coupling element extending radially outwardly from said secondary control shaft within said chamber, said secondary valve element having a radially extended opening snugly receiving the outer end of said coupling element, said primary valve element defining a circumferentially extended radial slot through which said coupling element extends, the length of said slot circumferentially of said primary valve element being greater than the thickness of said coupling element in the same direction, whereby to permit limited relative rotation between said primary and secondary valve elements, said secondary shaft being adapted to be coupled to the driven element of a fluid pressure operated device for common movements therewith in opposite directions, said housing defining inlet and return passages communicating with said chamber and adapted to be connected to a source of fluid under pressure, said housing further defining a pair of ports communicating with said chamber and adapted to be connected to said fluid pressure operated device to deliver fluid under pressure thereto and to receive return flow of fluid therefrom, said secondary valve element having ports communicating with respective passages and ports in said housing, said primary valve element defining passages intercommunicating with given ports in said secondary valve element to direct flow of fluid from said inlet passage to the return passage when said valve elements are disposed in neutral relationship and intercommunicating with given ports in the secondary valve element upon relative rotation therebetween to connect said inlet and return passages with respective ones of the ports in said housing, and means yieldingly urging said valve elements toward their neutral relationship.

2. In a reversing valve, a housing defining a cylindrical chamber, a cylindrical primary valve element extending axially of said chamber, a tubular secondary valve element closely encompassing said primary valve element and having its outer cylindrical surface closely slidably engaging the cylindrical surface of said chamber, axially aligned primary and secondary control shafts extending axially of said chamber and each journalled in a different end of said housing, said primary control shaft being connected to said primary valve element for common rotation therewith, said secondary valve element having a pair of aligned radial openings adjacent one end thereof, said secondary control shaft having an opening extending diametrically therethrough in alignment with said aligned openings in the secondary valve elements, a coupling pin extending through said aligned openings, said primary valve element defining a pair of diametrically opposed circumferentially extended slots through which said coupling pin extends, whereby said coupling pin couples said valve elements together for independent rotation in opposite directions relative to each other between an intermediate neutral relationship and predetermined limits of said independent rotation and for common unlimited rotation in opposite directions, said secondary shaft being adapted to be coupled to the driven element of a fluid pressure operated device for common movements therewith in opposite directions, said housing defining inlet and return passages communicating with said chamber and adapted to be connected to a source of fluid under pressure, said housing further defining a pair of ports communicating with said chamber and adapted to be connected to said fluid pressure operated device to deliver fluid under pressure thereto and to receive return flow of fluid therefrom, said secondary valve element having ports communicating with respective passages and ports in said housing, said primary valve element defining passages intercommunicating with given ports in said secondary valve element to direct flow of fluid from said inlet passage to the return passage when said valve elements are disposed in said neutral relationship and intercommunicating with given ports in the secondary valve element upon relative rotation therebetween to connect said inlet and return passages with respective ones of the ports in said housing, and means yieldingly urging said valve elements toward their neutral relationship.

References Cited in the file of this patent

UNITED STATES PATENTS

| | | |
|---|---|---|
| 1,479,544 | Johnson | Jan. 1, 1924 |
| 1,657,412 | Schneider | Jan. 24, 1928 |
| 1,937,470 | Davis | Nov. 28, 1933 |
| 1,947,973 | Davis | Feb. 20, 1934 |
| 1,947,991 | Jessop | Feb. 20, 1934 |
| 2,464,110 | Wright | Mar. 8, 1949 |
| 2,605,854 | MacDuff | Aug. 5, 1952 |

FOREIGN PATENTS

| | | |
|---|---|---|
| 655,892 | France | Apr. 24, 1929 |
| 391,775 | Great Britain | Apr. 26, 1933 |